G. A. HUMASON.

PUMP.

APPLICATION FILED AUG. 7, 1920.

Reissued Apr. 26, 1921. 15,095.

GRANVILLE A. HUMASON, *INVENTOR.*

BY Jesse R. Stone

*ATTORNEY.*

UNITED STATES PATENT OFFICE.

GRANVILLE ALLISON HUMASON, OF HOUSTON, TEXAS, ASSIGNOR OF ONE-HALF TO WILLIAM E. LANGLEY, OF HOUSTON, TEXAS.

PUMP.

15,095. Specification of Reissued Letters Patent. Reissued Apr. 26, 1921.

Original No. 1,325,565, dated December 23, 1919, Serial No. 330,060, filed October 11, 1919. Application for reissue filed August 7, 1920. Serial No. 402,015.

*To all whom it may concern:*

Be it known that I, GRANVILLE A. HUMASON, a citizen of the United States, residing at Houston, Harris county, Texas, have invented a certain new and useful Improvement in Pumps, of which the following is a full, clear, and exact description, such as will enable others skilled in the art to which it appertains to make and use the same.

My invention relates to an improvement in pumps for use in pumping oil or water or similar fluids from deep wells. It relates more specifically to the pumping of fluids which are filled with sand or other sediment or are sticky and viscous and do not flow freely so as to be easily discharged from the outlet pipe on the operation of the pump, but which become lodged therein and fail to flow.

One object of my invention is to provide a pump with means to assist the action of the pump in forcing the fluid upwardly through the discharge pipe and maintain a free flow therefrom at all times. Another object is to provide an apparatus of the character described wherein the sucker rod and piston used in the operation of the pump may be forced free of material which may be lodged therein at any time, either during the operation of the pump, or when the pump is at rest.

Figure 1:
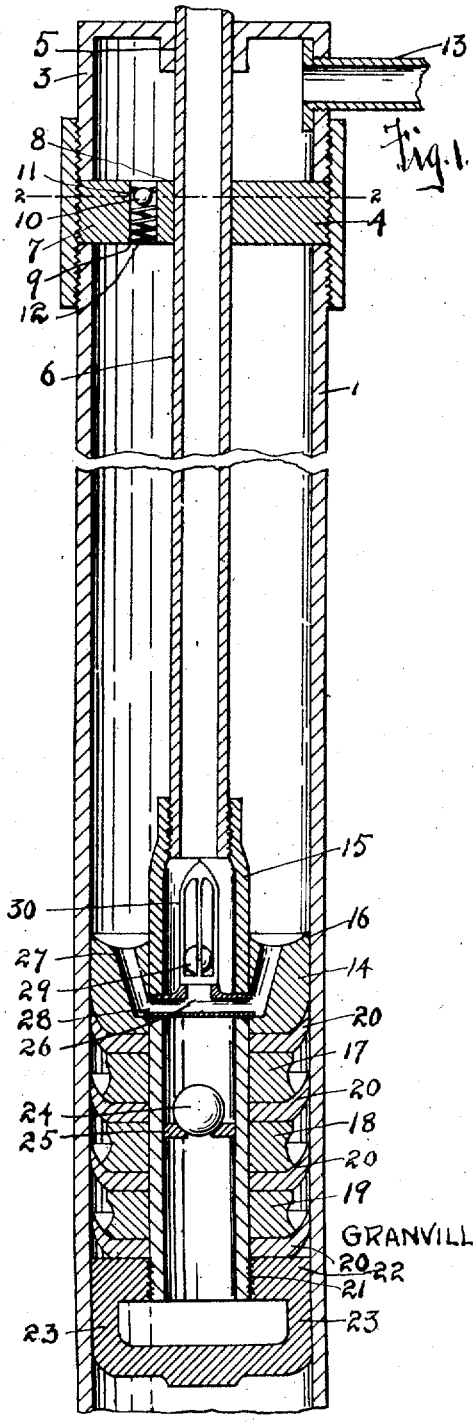
Figure 2:
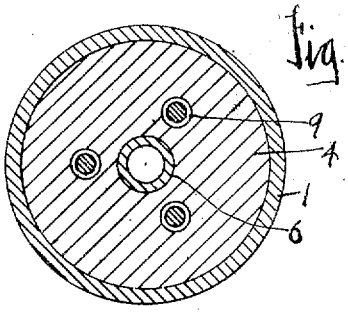
Figure 3:
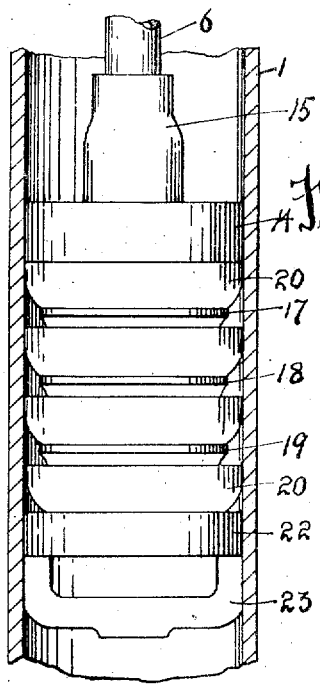

Referring to the drawing forming a part of this specification, and wherein like numerals of reference are applied to like parts throughout the several views, Figure 1 is a central longitudinal section through the main working parts of my improved pump; Fig. 2 is a transverse section taken on the plane 2—2 of Fig. 1; Fig. 3 is a broken section through the working barrel of my pump showing the piston in elevation.

My invention comprises a modification of an ordinary pump by means acting to force a discharge of some freely flowing fluid upwardly through the outlet discharge pipe of the pump, said discharge of fluid being actuated more or less automatically by the operation of the other parts. The type of pump used employs an ordinary pump piston, such as is now used in deep wells, and has a discharge for the fluid being pumped through the sucker rod connected with the piston. As an additional means of performing the pumping operation a fluid may be forced downwardly outside of the sucker rod and through a passage in the upper part of the piston so as to discharge a flushing fluid upwardly into the sucker rod and assist in carrying away the fluid being pumped.

Referring to the drawing, I have represented my piston as working within a working barrel 1 of ordinary construction, having at its upper end a cap 3 which is connected with the working barrel by means of a coupling member 4. The cap 3 is adapted to seal the upper end of the working barrel and is provided with a stuffing box 5 through which the sucker rod 6, connected with the plunger, is adapted to reciprocate. Threaded within the coupling member 4, which connects the working barrel with the cap 3, is an annular disk or diaphragm 7. This diaphragm has a central opening 8 through which the sucker rod may operate and is provided with a plurality of smaller longitudinal openings 9, which are controlled by a ball valve 10 held upwardly within the seat 11 by a helical spring 12. There are three of these valve-controlled passages, as shown, in Fig. 2, but I do not wish to be confined to any particular number, the purpose being to provide sufficient opening for a free downward flow of flushing fluid from the upper end of the working barrel. The cap 3 may also be provided with a lateral opening into which is threaded a connecting pipe 13 leading to the atmosphere or to a source of fluid under pressure, such as steam or compressed air or water.

The piston employed in connection with this pump is not, in its general construction, new in the art. It has an upper section 14 fixed upon a central pipe 15 threaded upon the sucker rod 6. This upper section is formed with a grooved upper surface, so formed as to provide a sharp upper edge 16 adjacent the working barrel, within which it fits snugly, for the purpose of scraping the working barrel free of sediment, which might act to work down between the plunger and the working barrel. There are separate additional sections 17, 18 and 19 below the upper section 14, each of these sections being spaced from the adjacent one by means of a flexible washer or cup 20, normally bent upwardly at the outer edge so as to form a tight fit between the plunger and the sides of the working barrel in operation. The lower end of the pipe 15 is threaded at 21 and provided with a special nut 22 having a lower wrench hold 23 for the purpose of operation. This nut serves to clamp the cups and the sections, between which they are placed, tightly between the said nut and the upper section 14. The channel through the interior of the pipe 15 is closed normally by an upwardly opening ball valve 24 fitting within a seat 25.

In order to deliver a discharge of lifting fluid upwardly within the sucker rod and thereby carry with it any material which may become lodged within the said sucker rod, I have provided a discharge opening 26 which opens upwardly within the pipe 15 adjacent the upper end of the piston. Fluid may be discharged into this outlet through a plurality of passages 27, leading from the upper end of the piston downwardly in an inclined direction to connect with the transverse pipe 28 within the central channel of the piston. Thus fluid forced downwardly through the passages 27 and 28 will be discharged upwardly through the outlet 26, past an upwardly opening ball valve 29 in the sucker rod, thereby serving to assist in lifting the fluid to the surface and in making the same more mobile. The ball valve 29 is prevented from being removed from its position by a valve cage 30 of ordinary construction.

The operation of my pump will now be clearly understood. The working barrel is, of course, understood to have the usual foot valve and other parts usually connected with the pump and the downward stroke of the piston will serve to force the fluid being pumped upwardly past the valve 24 and also past the discharge means 26 and through the sucker rod to the surface. Very often the fluid is so mixed with asphaltic material or with paraffin and other viscous materials that the working of the piston will not exert sufficient pressure to force the fluid upwardly through the sucker rod. Therefore, in the operation of my pump, I have provided that, under ordinary circumstances, air will find entrance through the inlet pipe 13 and downwardly past the valves 10 into the space between the piston and the diaphragm 4. Thus the downward stroke of the piston will serve to draw air inwardly through the diaphragm to fill the said space. The upward stroke, however, will close the valves 10 within the diaphragm and the compression of the air within the space will cause a flow of the air through the passages 27 and out through the discharge outlet 26 into the sucker rod with a strong upward impetus, thus acting in the nature of an air lift pump to assist in the raising of the fluid to the surface.

When the material being pumped is especially viscous because of the paraffin or asphaltic materials, it may be best to discharge through the pipe 13, into the space above the piston, a strong pressure of live steam. This steam will serve to warm the material within the sucker rod and will also exert a strong pressure upwardly through the sucker rod in the manner described and thus serve to prevent the lodging of material within the outlet pipe. It is obvious that either hot or cold water or other fluid may be also used in this connection. It is also possible to stop the pump and to flush the piston and sucker rod clear of all material by means of pumping in, through the connecting pipe 13, a supply of steam or water sufficient to clean the apparatus. It is to be noted that, when air from the atmosphere is used, the operation of the flushing device is practically automatic, the reciprocation of the piston being sufficient to draw the flushing material past the valve 10 in the diaphragm and to fill the space above the piston so that when the said material is compressed it will force its way upwardly through the sucker rod. When steam, air or other fluid under pressure is used in the manner previously stated, the action will not be entirely automatic and the diaphragm 7 may even be dispensed with, as will be obvious.

Having thus described my invention, what I claim as new and desire to protect by Letters Patent is:

1. In a pump, a working barrel, a piston reciprocable therein, a hollow sucker rod on said piston, a valve controlled diaphragm above said piston, said piston having means to draw a flushing fluid downwardly from the surface and discharge it upwardly through said sucker rod by the operation of said piston.

2. In a pump, a working barrel, a diaphragm closing the upper end of said working barrel, downwardly opening valves in said diaphragm, a sucker rod reciprocable through said diaphragm, a piston on said sucker rod, and means operated by the reciprocation of said piston to discharge a flushing fluid of different gravity from the liquid being pumped in an upward direction within said sucker rod.

3. In a pump, a working barrel extending from the surface down to the fluid being pumped, a piston reciprocable therein, a sucker rod connected therewith, a passage through said piston and said sucker rod for the fluid being pumped and means actuated by said piston to force a jet of flushing fluid brought down from the surface in a direction upwardly through said sucker rod for the purpose described.

4. In a pump, a pump barrel extending from the surface downwardly to the liquid being pumped, a piston therein, a hollow sucker rod connected with said piston, said piston being hollow and providing, with said sucker rod, an upward passage for the fluid being pumped, said piston also having passages connecting the space above said piston with said sucker rod, a diaphragm in said pump barrel above said piston whereby the reciprocation of said piston will cause a discharge of fluid drawn downwardly from the surface through said passages into said sucker rod.

5. In a pump, a working barrel, a piston reciprocable therein, a sucker rod on said piston, the upper end of said working barrel being closed, an inlet pipe connected therewith, a valve controlled diaphragm adjacent the upper end of said working barrel, and means in said piston whereby a discharge of fluid under pressure through said inlet pipe and said diaphragm will be projected upwardly from said piston through said sucker rod.

6. In a pump, a working barrel, a hollow sucker rod reciprocable therein, a piston on the lower end of said rod, a passage through said piston for the liquid being pumped, a valve in said passage, said sucker rod having a valve controlled opening adjacent the lower end thereof and spaced upwardly from said valve, to discharge therein a flushing fluid of different gravity from the liquid being pumped, for the purpose described.

7. In a pump, a working barrel closed at the upper end, a tubular piston therein, a valve in said piston, a hollow sucker rod connected with said piston, said working barrel having an opening adjacent the upper end thereof and said sucker rod having a valve-controlled opening into the working barrel above said piston and adjacent the lower end of said sucker rod into which fluid forced in under pressure from the surface will pass upwardly with the liquid being pumped, for the purpose described.

8. In a pump, a working barrel, a piston therein, a valve in said piston, a hollow sucker rod connected with said piston, a passageway leading from said sucker rod to the space within said working barrel at a point spaced above said valve, a second valve controlling the flow of fluid through said passageway, and means operable during the reciprocation of said sucker rod and piston to force flushing fluid different from the liquid being pumped through said passages into the liquid being pumped.

9. In a pump, a working barrel, a piston therein, having a central passage therethrough, a valve in said passage, a hollow sucker rod on said piston, an upwardly directed valve-controlled nozzle in said passage, a lateral inlet connecting the space above said piston with said nozzle whereby a flushing fluid may be projected upwardly in said sucker rod to assist in raising liquid from the well.

10. In a pump, a working barrel, an inlet thereto at the surface of the ground, a piston therein, a valve in said piston, a hollow sucker rod on said piston, an upwardly directed nozzle in said sucker rod above said piston valve and connections between said working barrel and said nozzle whereby flushing fluid may be forced downwardly outside said sucker rod to said nozzle in the manner and for the purpose described.

In testimony whereof, I hereunto affix my signature this the 30th day of July, A. D. 1920.

GRANVILLE ALLISON HUMASON.